(12) United States Patent
Vijayrangan (10) Patent No.: US 8,086,860 B2
(45) Date of Patent: Dec. 27, 2011

(54) METHOD FOR PREVENTING AND DETECTING HASH COLLISIONS OF DATA DURING THE DATA TRANSMISSION

(75) Inventor: Natarajan Vijayrangan, Andhra Pradesh (IN)

(73) Assignee: Tata Consultancy Services Limited, Mumbai (IN)

( * ) Notice: Subject to any disclaimer, the term of this patent is extended or adjusted under 35 U.S.C. 154(b) by 944 days.

(21) Appl. No.: 12/079,537

(22) Filed: Mar. 27, 2008

(65) Prior Publication Data

US 2009/0085780 A1  Apr. 2, 2009

(30) Foreign Application Priority Data

Oct. 1, 2007 (IN) .......................... 1937/MUM/2007

(51) Int. Cl.
| | |
|---|---|
| *H04L 29/06* | (2006.01) |
| *H04L 9/32* | (2006.01) |
| *G06F 11/00* | (2006.01) |
| *G06F 17/30* | (2006.01) |
| *G06F 7/00* | (2006.01) |
| *H04K 1/00* | (2006.01) |

(52) U.S. Cl. ........ 713/176; 713/160; 713/180; 713/181; 726/23; 726/26; 380/255; 707/698; 707/692; 707/693; 707/747

(58) Field of Classification Search .................. 713/160, 713/176, 180, 181; 726/23, 26; 380/255; 707/692, 693, 698, 747
See application file for complete search history.

(56) References Cited

U.S. PATENT DOCUMENTS

| | | | |
|---|---|---|---|
| 5,892,829 | A | 4/1999 | Aiello |
| 6,021,201 | A | 2/2000 | Bakhle |
| 6,052,698 | A | 4/2000 | Bennett |
| 6,091,821 | A | 7/2000 | Buer |
| 6,141,421 | A | 10/2000 | Takaragi |
| 2006/0294386 | A1 | 12/2006 | Yuval |

FOREIGN PATENT DOCUMENTS

WO    WO 2004/042602 A1    5/2004

*Primary Examiner* — Mohammad Reza
(74) *Attorney, Agent, or Firm* — Charles A. Muserlian (57) ABSTRACT

A means for avoiding hash collisions by means of message pre-processing function to increase randomness and reduce redundancy of an input message whereby hash collisions are avoided when it is applied before hashing any message and the message pre-processing function comprises 4 steps like shuffling of bits, compression T-function and LFSR which steps increase the entropy of the input message at the end of 4 rounds, the output becomes more random.

34 Claims, 7 Drawing Sheets

METHOD FOR PREVENTING AND DETECTING HASH COLLISIONS OF DATA DURING THE DATA TRANSMISSION

FIELD OF INVENTION

The invention relates to the field of cryptography and Information Theory.

BACKGROUND OF INVENTION

In cryptography, a cryptographic hash function is a transformation that takes an input and returns a fixed-size string, which is called the hash value. Hash functions with this property are used for a variety of computational purposes, including cryptography. The hash value is a concise representation of the longer message or document from which it was computed. The message digest is a sort of "digital fingerprint" of the larger document. Cryptographic hash functions are used to do message integrity checks and digital signatures in various information security applications, such as authentication and message integrity.

A hash function takes a string (or 'message') of any length as input and produces a fixed length string as output, sometimes termed a message digest or a digital fingerprint. A hash value (also called a "digest" or a "checksum") is a kind of "signature" for a stream of data that represents the contents. One analogy that explains the role of the hash function would be the "tamper-evident" seals used on an application package.

In various standards and applications, MD (Message Digest) and SHA (Secure Hash) functions have been consistently evolved, implemented and used.

The MD1, MD2, MD3, MD4, MD5 (Message-Digest) are a series of structured functions; widely used, cryptographic hash functions with a 128-bit hash value.

The SHA (Secure Hash) functions (SHA1, SHA2, SHA3, SHA4, SHA5) are five cryptographic hash functions designed by the National Security Agency (NSA) and published by the NIST as a U.S. Federal Information Processing Standard. Hash functions compute a fixed-length digital representation (known as a message digest) of an input data sequence (the message) of any length. They are called "secure" when (in the words of the standard), "it is computationally infeasible to:
1. find a message that corresponds to a given message digest, or
2. find two different messages that produce the same message digest.

Any change to a message will, with a very high probability, result in a different message digest."

The recent advances in cryptanalysis of hash functions have been spectacular, and the collision attacks on MD5 and SHA-1 are of particular importance since these are so widely deployed.

MD5 collisions can be easily found. The analytical attack was reported to take one hour on an IBM p690 cluster. MD5 has been known to be weak for a long time but it is still used with no catastrophic consequences.

SHA-1 is also widely deployed but has collision-resistance problems. SHA-1 collisions are found if the number of rounds is reduced from 80 to about 50. In theory, collisions in SHA-1 can be found in $2^{69}$ attempts or hash evaluations. But this is only for a reduced-round version, and even then it is too expensive. So far no one has found collisions for SHA-1 using all rounds.

SHA-1 is derived from SHA-0, and SHA-256 is derived from SHA-1. These algorithms depend on intuition-based design that failed twice for SHA-0 and SHA-1. Given the attacks on the collision resistance of SHA-1 and the close relationship between the designs of SHA-1 and SHA-256, there is not much confidence on the collision resistance of SHA-256. Evaluation of SHA-256 is also difficult because it not known which attacks it was designed to protect against, or the safety margins assumed.

Thus, there is doubt over the design philosophy of the MD/SHA-family. Since the current class of functions is flawed, one option to counter this threat is to upgrade to a stronger hash function. Alternatively message pre-processing is a method that can be used for the above purpose. This technique can be combined with MD5 or SHA-1 so that applications are no longer vulnerable to the known collision attacks. The pre-processing function resists collision attacks in Hash functions. In this method, the given message (input) is pre-processed before being hashed. The rationale behind pre-processing is that the given message is made more random before being passed into the hash function. This reduces the redundancy in the input data, thus leading to a lower probability of finding a collision. This method is called Message Pre-processing.

A hash function is a one-way function that maps an arbitrary length message into a fixed length sequence of bits. There are two basic requirements for a secure hash function, namely, the collision resistance property that is, it should be hard to find two different messages with the same hash result and the pre-image resistance property, which means, given a hash value, it should be hard to find a message that would generate that hash value.

The definitions designated are:
The hash value of a message m as H(m).
Collision: find two distinct messages m, m' such that H(m)=H(m').
$1^{st}$ pre-image: Given a hash value HV, find m such that H(m)=HV.
$2^{nd}$ pre-image: Given a message m, find another message m' such that H(m')=H(m).
In a hash function of length n:
A brute force attempt to find a collision should require at least $2^{n/2}$ hash operations.
Brute force attempts to find $1^{st}$ and $2^{nd}$ pre-images should require at most $2^n$ hash operations.

A cryptographic hash function is a function with certain additional security properties to make it suitable for information security applications such as authentication and message integrity.

In 1990, Ronald Rivest proposed the MD4 Hash function (RFC 1320). Hans Dobertin published collision attacks on MD4 in 1996.

In 1991, Ronald Rivest improved MD4 and called it MD5 Hash function. The output of MD5 is 128 bits. Later, in the year of 2004, Xiaoyun Wang, Dengguo Feng, Xuejia Lai, and Hongbo Yu published collisions of full MD5.

The SHA (Secure Hash Algorithm) hash functions are five cryptographic hash functions designed by the National Security0 Agency (NSA) and published by the NIST as a U.S. Federal Information Processing Standard. SHA consists of five algorithms: SHA-1, SHA-224, SHA-256, SHA-384 and SHA-512. In the year of 1992, NIST published SHS (Secure Hash Standard) called now SHA-0. Joux, Carribault, Lemuet, and Jalby published collisions for full SHA-0 in 2004. In February 2005, an attack by Xiaoyun Wang, Yiqun Lisa Yin, and Hongbo Yu was announced. The attacks can find collisions in the full version of SHA-1, requiring fewer than 269 operations.

PRIOR ART

U.S. Pat. No. 5,892,829 granted to William A. Aiello et. al. discloses a design of secure hash function based on stretch function and compression function. The stretch function is one-way. The compression function is a cryptographic primitive selected from a family of compression functions. A standard key scheduling algorithm of the cryptographic compression function (such as DES) is replaced and an output of the stretch function is used as the key. The stretch function output randomizes the input string. Further the security constraints on the compression function are less stringent.

U.S. Pat. No. 6,021,201 granted to Derek L. Davis et. al. discloses a cryptography unit having a cipher unit and a hash unit, both are coupled in parallel for simultaneous ciphering and hashing. The cipher unit implements a cipher algorithm that operates on a data block having a first predetermined size M. The hash unit implements a hash algorithm on a data block having a second predetermined size N. Buffers of a size Q, where Q is an integer multiple of M and N, are employed to receive the input data into the invention. A security unit ensures that the cipher unit and the hash unit operate on the same data block of size Q.

European Patent EP 1556781 granted to Plessier et. al. discloses an apparatus which is arranged to accept digital data as an input, and to process said data according to one of either the Secure Hash Algorithm (SHA-1) or Message Digest (MD5) algorithm to produce a fixed length output word.

U.S. Pat. No. 6,091,821 granted to Mark Leonard Buer discloses a pipelined hardware implementation of hash functions.

U.S. Pat. No. 6,141,421 granted to Hiroyuki Kurumatani et al discloses a method and apparatus for generating hash value. The method transforms input data to data having an arbitrary length so that the resultant data is difficult to be inversely transformed. The method generates a hash value of data generated from the input data and random number data, executes a one to one transformation to a part of the input data by using the hash value as a parameter and outputs the intermediate generation data as a part of masking data; and executes the one to one transformation to a part of the input data by using intermediate generation data obtained during the one to one transformation.

U.S. Pat. No. 6,052,698 granted to Bennet et al discloses the reorganization of collisions in a hash bucket of a hash table to improve system performance.

United States Patent 20060294386 granted to Yual Gideon et al discloses a system to strengthen secure hash functions.

These inventions are not of much use to avoid hash collisions. Thus message pre-processing for hash function was needed to detect the hash collision errors.

OBJECTS OF INVENTION

The broad object of the invention is to protect Information security systems during transmission of data.

The object of this invention is to provide a method for preventing hash collisions.

Another object of this invention is to provide a method for detecting hash collisions.

The object of this invention is to provide a method for pre-processing for hash functions.

Another object of this invention is to provide a method for transmission of data which is reliable.

Still one more object of this invention is to provide a method of pre-processing which is simple and easy to implement.

SUMMARY OF THE INVENTION

The system and method in accordance with this invention discloses a means for avoiding hash collisions by means of message pre-processing.

Typically, a message pre-processing function is used to increase randomness and reduce redundancy of an input message. With the help of the message pre-processing operations, hash collisions are avoided if it is applied before hashing any message.

Typically, the message pre-processing function comprises 4 steps: Shuffling of bits, Compression, T-function and LFSR. These steps increase the entropy of the input message. At the end of 4 rounds, the output becomes more random. For various set of files, the entropy values in the sequence of operations: Shuffling, Compression, T-function and LFSR are in increasing order. For various set of files, the random properties of message pre processing output are better than T-function, Compression, Shuffling and Input file. The entropy comparison of message pre processing with LFSR operation shows that a file directly passed into the LFSR operation (LFSR output) undergoes less randomization compared with the message pre processing of the same file. Therefore, the entropy of message pre-processing output is higher than LFSR output. The entropy of message pre-processing ensures a good randomization. The message pre-processing function with cipher block chaining mode becomes a hash function.

Typically, the output of pre-processing is passed into a hash function, which gives the hash output. The output of this method reduces hash collision and gives unique results.

Thus, the entire process reduces the chances of collision of the hash outputs. Further, the invented process is extended to signature protocols, which make them more secure.

A system for preventing hash collisions during transmission of data, comprises:
  a) message generator adapted to generate a message;
  b) pre processor adapted to pre process said message to resist collision attack, said pre processor comprising:
    i) shuffling means adapted to shuffle bits of said message to obtain shuffled bits;
    ii) compression means adapted to compress said shuffled bits, remove redundancies, and increase randomness of said shuffled bits;
    iii) means to carry out T-functioning of said compressed shuffled bits to achieve compressed shuffled bits with avalanche effect in said data; and
    iv) means to perform Linear Feedback Shift Registration (LFSR) of said compressed shuffled bits to obtain a pre processed message;
  c) inputting means adapted to input said generated message in said pre processor; and
  d) hashing means adapted to hash said pre processed message to obtain a hashed value.

Typically, said shuffling means comprises a statistical means to produce a statistical effect on the output bits.

Typically, said compression means is a reversible loss less compression means.

Typically, said compression means is a bijective compression means.

In accordance with an embodiment of this invention, said means to carry out T-functioning comprises a mapping means adapted to carry out bijective mapping of said bits for updating each of said bit of said message.

Typically, said means to carry out T-functioning is a means to carry out triangular T-functioning.

In accordance with a preferred embodiment of this invention, said means to carry out T-functioning comprises a dispersing means adapted to specify message hashes to be dispersed over the entire bits.

Typically, said T-functioning means is a bijective T-functioning means.

Typically, said T-functioning means is an invertible T-functioning means.

Typically, said means to perform Linear Feedback Shift Registering (LFSR) is a bijective means.

In accordance with another embodiment of this invention, said system comprises:
- a) a message generator adapted to generate a message;
- b) a pre processor adapted to pre process said message to resist collision attack;
- c) a hashing means adapted to hash said pre processed message and to obtain a hashed output value;
- d) a signature generating means adapted to generate a signature of said hashed output value;
- e) a comparator means adapted to compare said generated signature of said hashed output value and said pre processed message to detect invalid signature due to message tampering.

Typically, a method for preventing hash collisions during transmission of data comprises the following steps:
- a) Generating a message m;
- b) Inputting the message m to a pre processor;
- c) Pre processing the message m to resist collision attacks;
- d) Hashing the message m;
- e) Producing a hash output value; and thereby
- f) Reducing hash collision.

Typically, said step of message m pre processing further comprises the following steps:
- a) Shuffling of message bits to improve data diffusion;
- b) Compression of message bits to remove redundancies in the data and to increase randomness of data;
- c) T-functioning of message bits to achieve an avalanche effect in the data; and
- d) Linear Feed back Shift Registering (LFSR) of message bits to achieve randomness of the data.

Typically, said step of shuffling of bits further comprises the step of producing a statistical effect on the output bits.

In accordance with an embodiment of this invention, said step of shuffling of bits further comprises the step of dissipating the redundancy in the statistics of input data to the output data.

Typically, said step of shuffling is bijective.

Typically, the swapping of message bits in the reverse order accomplishes inverse shuffling.

In accordance with an embodiment of this invention, said step of compression further comprises the step of affecting directly or indirectly any later bit of output bit by any input bit.

Typically, said step of compression generates a fast avalanche effect.

Typically, said step of compression is a reversible loss less compression algorithm to avoid data loss.

Typically, said step of compression is bijective.

In accordance with a preferred embodiment of this invention, said step of T functioning comprises the step of bijective mapping of bits for updating every bit of the message.

Typically, said step of updating follows a linear combination of the same bit and a function of a subset of its less significant bits.

Typically, said T function is triangular.

Typically, said step of T functioning comprises the step of abstracting mathematically the non-linearity between input and output bits.

Typically, said step of T functioning comprises the step of specifying message hashes to be dispersed over the entire bits.

Typically, said T functioning is bijective and invertible.

Typically, said step of T functioning follows the Boolean function $(2x^2+x) \mod 2^{32}$ where 32 is the no. of bits x of message m.

Typically, said step of LFSR of bits further comprises a step of generating sequences of highly dense primitive polynomials of maximum period.

Typically, said primitive polynomial is irreducible of degree 32 and period $2^{32}-1$.

Typically, step of LFSR of bits comprises the step of shifting the 32 bit input data with said primitive polynomial.

Typically, said step of shifting is performed for 4 to 15 cycles.

Typically, said step of LFSR is bijective.

Typically, said step of LFSR of bits comprises the step of inputting said linear feedback shift registered bits into a hash function to generate a hash output value.

In accordance with another embodiment of this invention, a method for detecting hash collisions during transmission of data comprises the following steps:
- a) Generating a message m;
- b) Pre processing the message m to generate MP (m);
- c) Generating the hash of pre processed message m as H (MP (m));
- d) Generating the signature of the said hash as {sign (H (MP (m)};
- e) Comparing the said generated signature of message m and the message pre processing function of message m (1);
- f) Detecting an invalid signature due to message tampering.

BRIEF DESCRIPTION OF DRAWINGS

The invention will now be described with reference to the accompanying drawing, in which.

DETAILED DESCRIPTION OF THE DRAWINGS

The methods by which hash functions can avoid collisions. In our invention, we have designed and analyzed a new message pre-processing function used to increase randomness and reduce redundancy of an input message. It is shown that such pre-processing, if applied before hashing any message, helps to avoid collisions that might otherwise occur.

Figure 1:
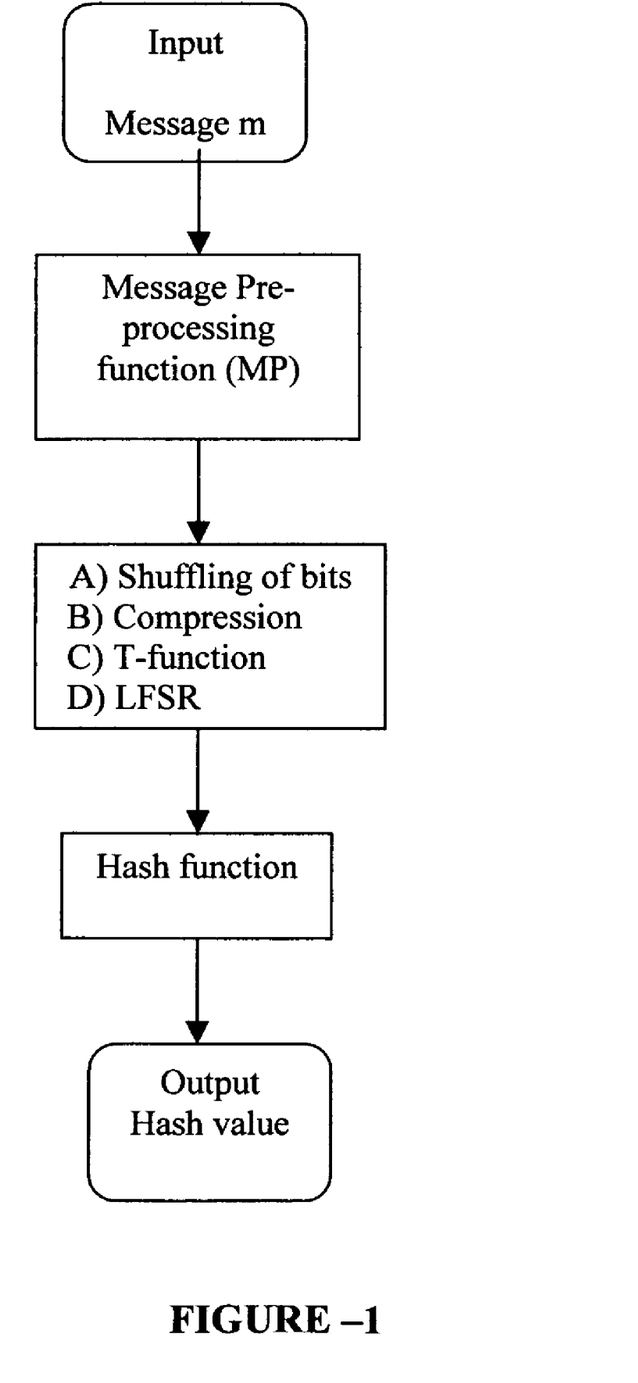
FIG. 1 illustrates process in accordance with this invention.

FIG. 1 in accordance with the accompanying drawings illustrates the flow of the method in accordance with this invention. The input message is given as 'm'. 'MP' is the message pre-processing function used to randomize the input message. Hash function is carried over the output of the pre-processing function, which gives the final hash output. The hash output so obtained has very less probability of collision.

Figure 2:
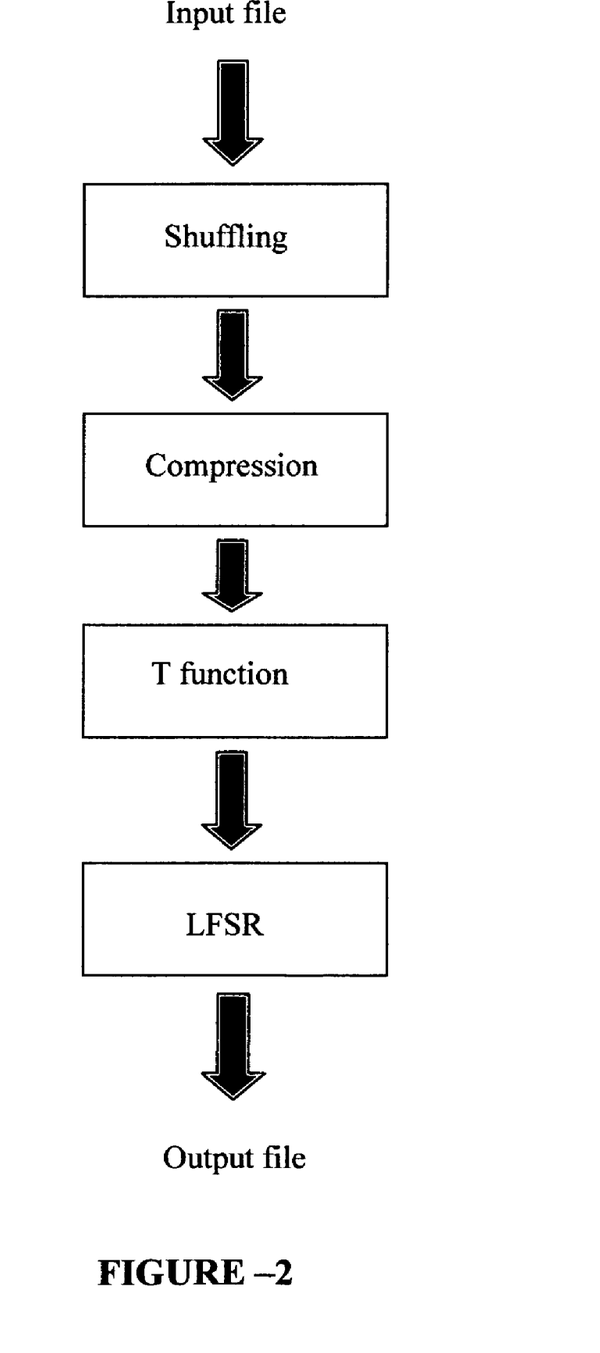
FIG. 2 illustrates Message Pre-processing steps in accordance with this invention.

FIG. 2 in accordance with the accompanying drawings illustrates the steps in message pre-processing function, which reduces the redundancy in the input data and randomizes the input message. This results in a lower probability of a collision. The said pre-processing function comprises 4 steps: Shuffling of bits, Compression, T-function and LFSR. Each round of the MP function is explained as follows.

Shuffling of Bits

The shuffling function is simple one to keep the overall algorithm fast and it has
a significant statistical effect on the output—the shuffling of
  bits helps to improve the diffusion. Diffusion refers to the
  property that redundancy in the statistics of the input is
  "dissipated" in the output. The inverse of the shuffle operation can easily be accomplished by performing the swaps in
  reverse order. Therefore, the shuffling operation is bijective.
  For example,
the input message=abcd efgh ijkl mnop ABCD EFGH IJKL MNOP.
After shuffling,
the output=aAbB cCdD eEfF gGhH iIjJ kKlL mMnN oOpP.

Compression

The output of the shuffling function is the input to the compression function. The compression algorithm has the property of being able to have any bit of the input affect, both directly and indirectly, any later bit of output causing a fast avalanche effect.

Unlike hash functions, the compression is used in this design only once. The compression function is used to further remove the redundancies in the data, and thus to increase randomness. Reversible lossless compression algorithm is used for this purpose. The reason for choosing a reversible compression mechanism is to avoid data loss. Since the compression function is bijective, it does not cause any collision.

T-Function

After the execution of the compression function, the output of the compression function is input to a T-function. The T-function is a bijective mapping that updates every bit of the state in a way that can be described as $x_i'=x_i+f(x_0, \ldots x_{i-1})$, or in simple words is an update function in which every bit of the state is updated by a linear combination of the same bit and a function of a subset of its less significant bits. If every single less significant bit is included in the update of every bit in the state, such a T-function is called triangular.

All the Boolean operations and most of the numeric operations in modem processors are T-functions, and all their compositions are also T-functions. The T-function helps to achieve the avalanche effect. The avalanche effect tries to mathematically abstract the much desirable property of highly non-linearity between the input and output bits, and specifies that the hashes of messages from a close neighborhood are dispersed over the whole space.

In accordance with the invention, the T-function used, is the composition of primitive operations so that the T-function is invertible. Since the T-function is bijective, there are no collisions, and hence no entropy loss regardless of the Boolean functions and regardless of the selection of inputs.

The T-function used is $(2x^2+x) \bmod 2^{32}$, where 32 is the number of bits (of x). This is an invertible mapping, which contain all the $2^{32}$ possible states on a single cycle for any word size 32.

LFSR (Linear Feedback Shift Register)

The output of the T function is given as input to the LFSR. Primitive polynomials over $GF(2^n)$ are useful in the design of LFSRs for generating sequences of maximum period. All generated primitive polynomials are highly dense as well as random (highly dense means more number of tabs).

Each time the 32-bit input is executed with a primitive polynomial of degree 32 and the linear shift process undergoes for different cycles. Thus, even if the input bits are identical, the output will be random.

The primitive polynomial used in LFSR is $x^{32}+x^{26}+x^{23}+x^{22}+x^{16}+x^{12}+x^{11}+x^{10}+x^8+x^7+x^5+x^4+x^2+x+1$ over $GF(2^{32})$. This is an irreducible polynomial of degree 32 whose period is $2^{32}-1$. Experimentally, it is tested that the output of LFSR round gets more random, when each 32-bit input is shifted with the given primitive polynomial for 4 to 15 cycles.

Inverse of LFSR can be obtained with respect to the same primitive polynomial used for LFSR as well as output of LFSR. Therefore LFRS is bijective. The inverse operation consumes a little bit time.

Thus the above four steps of Message Pre-processing function provide diffusion, avalanche effect, statistical irrelevance and randomness. It further removes the redundancies of a message (input) and make the message non linear and more random.

Since each round of the message pre-processing function is bijective, the overall message pre-processing function is also bijective. This means that it is impossible to have any two messages m and m' such that they give the same output after message pre-processing. If MP is the message pre-processing function, then $MP(m) \neq MP(m')$ for any two different messages m and m'.

Therefore, the MP function (algorithm) contributes to provide randomness and reduce redundancy (diffusion of data). We have tested that the MP function performs well over SHA (SHA-1 & SHA-256).

Message Pre-Processing Function—Bijective

The Message Pre-processing (MP) is neither a hash function nor an encryption algorithm. It cannot be called a hash function because the output file size of the MP function is either the original file size or slightly more than the size. The size of the file after shuffling remains the same or has a very slight expansion due to padding. Then compression algorithm reduces the file size. Due to the functional properties of T-function and LFSR, the file size increases after compression round. At the end of four rounds, the output file becomes either the same size of the input file or slightly more. In encryption, the sender and the receiver share some secret information, which is used to encrypt and decrypt the data in order to maintain confidentiality. But in Message Pre-processing, there is no such secret information (trapdoor function) used to compute the output. Also, the entire process can be reversed by anyone, since the MP function is bijective. It is shown in FIG. 3 that H(m) and H(MP(m)) are different for any message m.

Signature Protocols with Message Pre-Processing

Figure 4:
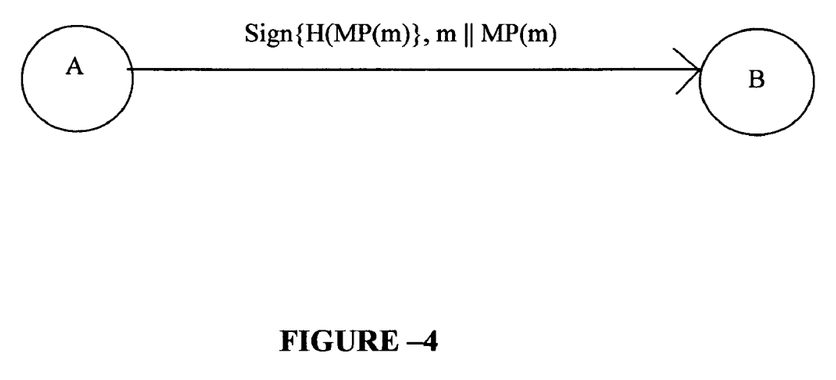
FIG. 4 illustrates Signature protocols with message pre-processing in accordance with this invention.

The protocol starts with A sending to B the message m∥MP (m), Hash of message preprocessing of the message H(MP(m)) and the signature of the hash {sig(H(MP(m))}. Even if the attacker finds another message m' different from m such that H(m)=H(MP(m')), the result is mathematically proved that it is not possible to find a message m' such that MP(m)=MP(m'). Therefore, the proposed protocol is secure.

Figure 3:
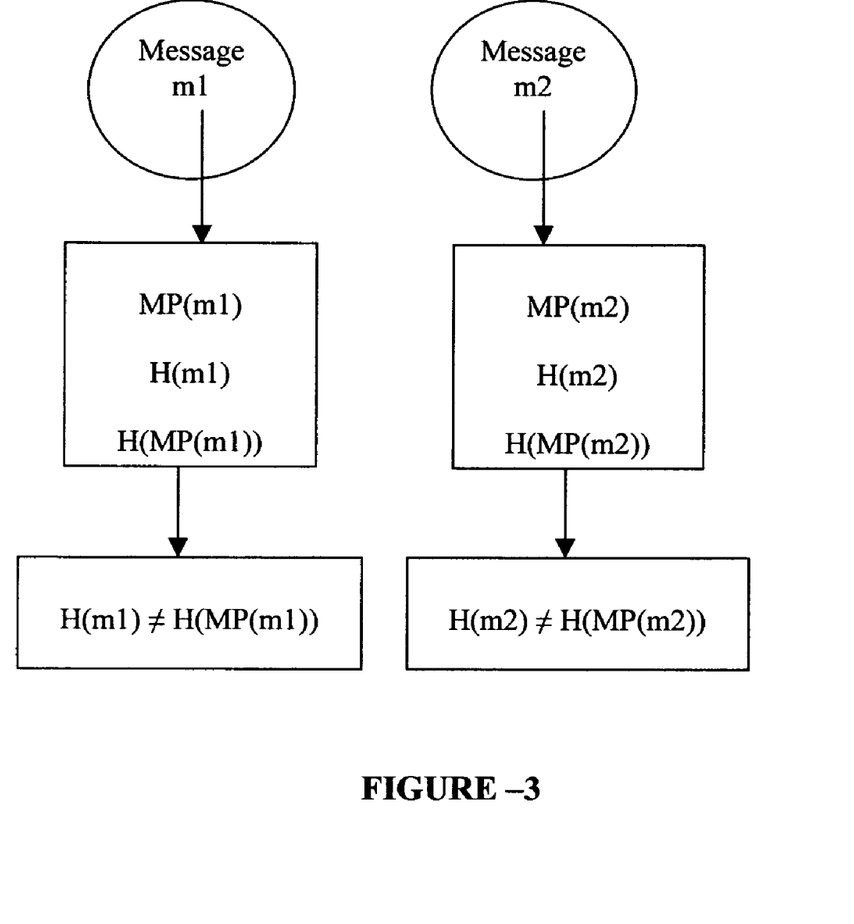
FIG. 3 illustrates Hash process without collisions in accordance with this invention.

FIG. 3 in accordance with the accompanying drawings illustrates Hash process, which produces hash output values without collisions. For two different messages m1 and m2, their hash values H(m1) and H(m2) and message pre processing values MP(m1) and MP(m2) such that $H(m1) \neq H(MP(m1))$ and $H(m2) \neq H(MP(m2))$.

Figure 5:
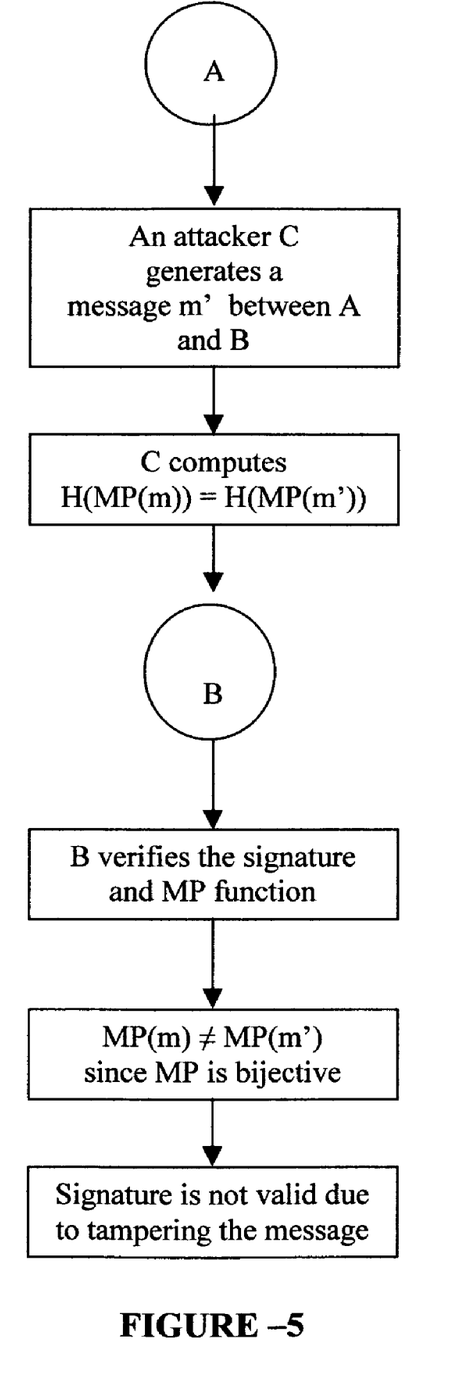
FIG. 5 illustrates Adversary attacks on the signature protocols in accordance with this invention.

FIG. 4 and FIG. 5 in accordance with the accompanying diagrams depict the flow and attacks of the invented signature protocols.

Figure 6:
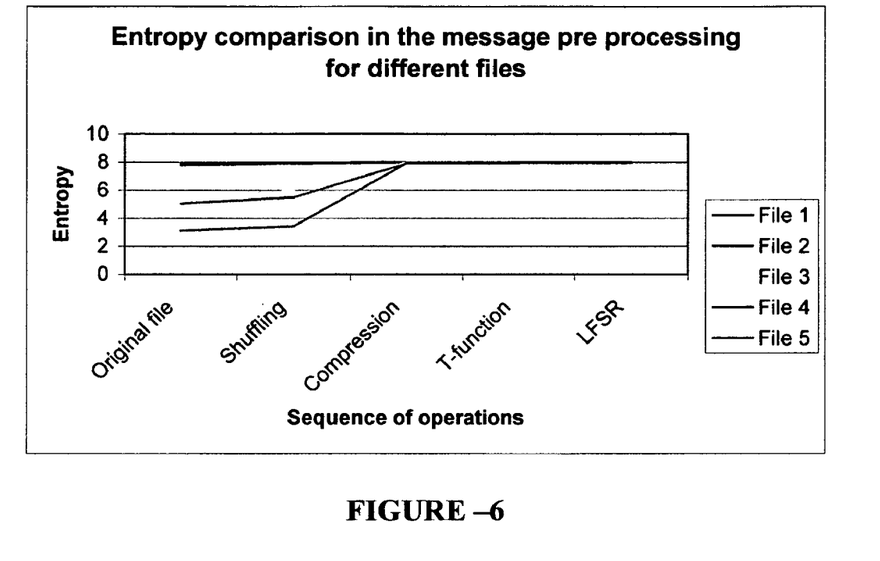
FIG. 6 illustrates Entropy comparison of message pre-processing in accordance with this invention.

FIG. 6 in accordance with the accompanying drawings illustrates entropy comparison in the message pre-processing for different files. During the message pre-processing, a file undergoes a sequence of operations: Shuffling, Compression, T-function and LFSR. The entropy values of a file under these operations are plotted in a graph. Similarly, the entropy values for different set of files are recorded in the graph.

Figure 7:
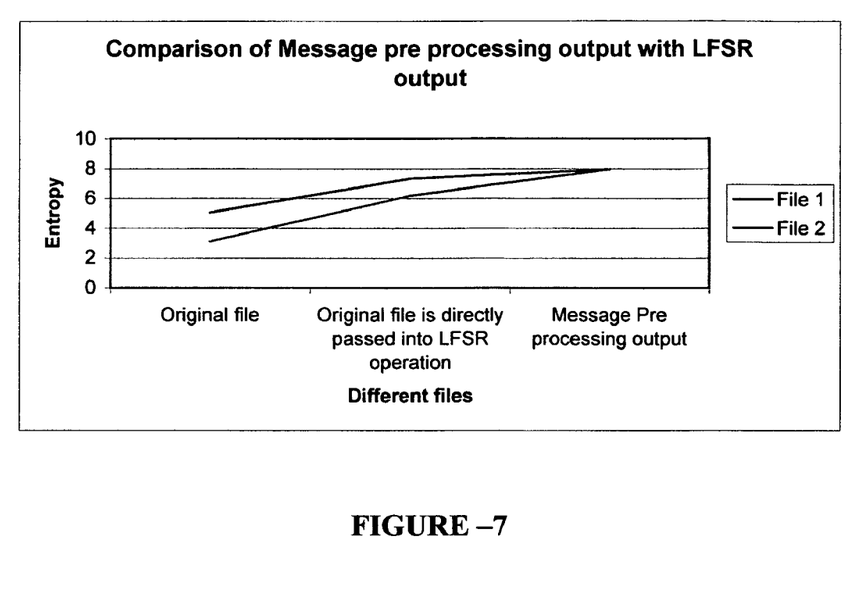
FIG. 7 illustrates Comparison of message pre-processing with LFSR.

FIG. 7 in accordance with the accompanying drawings illustrates entropy comparison of message pre-processing with LFSR operation, which shows that a file directly passed into the LFSR operation (LFSR output) undergoes less randomization compared with the message pre-processing of the same file (message pre-processing output).

Implementation Results

Entropy and randomness tests were performed on the input and output files. The entropy of the output file is in the range 7.3 to 7.99 and it was always higher than that of the corresponding input file.

The following results are analyzed using Statistical tests on the input and output files of message pre-processing.

Result 1:
(a) Statistical Results of Input File 1
Entropy=4.264957 bits per byte.
Optimum compression would reduce the size of this 60228 byte file by 46 percent.
Chi square distribution for 60228 samples is 2671484.33, and randomly would exceed this value 0.01 percent of the times.
Arithmetic mean value of data bytes is 67.1896 (127.5=random).
Monte Carlo value for Pi is 3.369994023 (error 7.27 percent).
Serial correlation coefficient is 0.593774 (totally uncorrelated=0.0).
(b) Statistical Results of Output File 1
Entropy=7.987451 bits per byte.
Optimum compression would reduce the size of this 14548 byte file by 0 percent.
Chi square distribution for 14548 samples is 250.55, and randomly would exceed this value 50.00 percent of the times.
Arithmetic mean value of data bytes is 128.0510 (127.5=random).
Monte Carlo value for Pi is 3.120462046 (error 0.67 percent).
Serial correlation coefficient is 0.003850 (totally uncorrelated=0.0).

Result 2:
(a) Statistical Results of Input File 2
Entropy=3.450423 bits per byte.
Optimum compression would reduce the size of this 61764 byte file by 56 percent.
Chi square distribution for 61764 samples is 5756458.10, and randomly would exceed this value 0.01 percent of the times.
Arithmetic mean value of data bytes is 37.4918 (127.5=random).
Monte Carlo value for Pi is 3.855838352 (error 22.74 percent).
Serial correlation coefficient is 0.291492 (totally uncorrelated=0.0).
(b) Statistical Results of Output File 2
Entropy=7.982900 bits per byte.
Optimum compression would reduce the size of this 10575 byte file by 0 percent.
Chi square distribution for 10575 samples is 247.86, and randomly would exceed this value 50.00 percent of the times.
Arithmetic mean value of data bytes is 126.8490 (127.5=random).
Monte Carlo value for Pi is 3.144154370 (error 0.08 percent).
Serial correlation coefficient is 0.007816 (totally uncorrelated=0.0).

The following results are analyzed using Statistical tests on the input and output files in the sequence of operations: Shuffling, Compression, T-function and LFSR.

Result 3:
(a) Statistical Results of Input File 3
Entropy=3.124613 bits per byte.
Optimum compression would reduce the size of this 28672 byte file by 60 percent.
Chi square distribution for 28672 samples is 2489498.79, and randomly would exceed this value 0.01 percent of the times.
Arithmetic mean value of data bytes is 71.1914 (127.5=random).
Monte Carlo value for Pi is 3.174550021 (error 1.05 percent).
Serial correlation coefficient is 0.806530 (totally uncorrelated=0.0).
(b) Statistical Results of Shuffling Output
Entropy=3.438752 bits per byte.
Optimum compression would reduce the size of this 28672 byte file by 57 percent.
Chi square distribution for 28672 samples is 2120187.36, and randomly would exceed this value 0.01 percent of the times.
Arithmetic mean value of data bytes is 71.7487 (127.5=random).
Monte Carlo value for Pi is 3.187107576 (error 1.45 percent).
Serial correlation coefficient is 0.837586 (totally uncorrelated=0.0).
(c) Statistical Results of Compression Output
Entropy=7.949836 bits per byte.
Optimum compression would reduce the size of this 7444 byte file by 0 percent.
Chi square distribution for 7444 samples is 559.27, and randomly would exceed this value 0.01 percent of the times.
Arithmetic mean value of data bytes is 122.4017 (127.5=random).
Monte Carlo value for Pi is 3.303225806 (error 5.14 percent).
Serial correlation coefficient is 0.068855 (totally uncorrelated=0.0).
(d) Statistical Results of T Function Output
Entropy=7.966139 bits per byte.
Optimum compression would reduce the size of this 7444 byte file by 0 percent.
Chi square distribution for 7444 samples is 378.86, and randomly would exceed this value 0.01 percent of the times.
Arithmetic mean value of data bytes is 125.8172 (127.5=random).
Monte Carlo value for Pi is 3.187096774 (error 1.45 percent).
Serial correlation coefficient is 0.026807 (totally uncorrelated=0.0).
(e) Statistical Results of LFSR Output (Message Pre Processing Output)
Entropy=7.966995 bits per byte.
Optimum compression would reduce the size of this 7444 byte file by 0 percent.
Chi square distribution for 7444 samples is 402.10, and randomly would exceed this value 0.01 percent of the times.
Arithmetic mean value of data bytes is 126.1102 (127.5=random).
Monte Carlo value for Pi is 3.129032258 (error 0.40 percent).
Serial correlation coefficient is 0.019329 (totally uncorrelated=0.0).

INDUSTRIAL APPLICATIONS

The Message Pre-processing function described above finds a number of applications in Information Security. The MP function can be applied before hashing to avoid collisions. Wherever Hash function is applicable, the invention process m→MP→H→HV can be used instead of Hash. Some specific areas where our process can be applied are:
1. Signature protocols
2. Digital Identity
3. Access Control
4. Multifactor Authentication
5. Message Authentication Code (MAC)
6. Data integrity in a relational database While considerable emphasis has been placed herein on the particular features of method for pre-processing for a hash function, the improvisation with regards to it, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A system for preventing hash collisions during transmission of data, said system comprising:
   (a) message generator configured to generate a message;
   (b) pre processor configured to pre process said message to resist collision attack, said pre processor comprising:
      i) means for shuffling bits of said message to obtain shuffled bits;
      ii) means for compressing said shuffled bits, removing redundancies, and increasing randomness of said shuffled bits;
      iii) means for carrying out T-functioning of said compressed shuffled bits to achieve compressed shuffled bits with avalanche effect in said data; and
      iv) means for performing Linear Feedback Shift Registration (LFSR) of said compressed shuffled bits to obtain a pre processed message;
   (c) means for inputting said generated message in said pre processor;
   (d) means for hashing said pre processed message to obtain a hashed value;
   (e) means for generating a signature of said hashed value; and
   (f) means for comparing said generated signature of said hashed value and said pre processed message to detect invalid signature due to message tampering.

2. A system as claimed in claim 1 wherein, said shuffling means comprises a statistical means to produce a statistical effect on the output bits.

3. A system as claimed in claim 1 wherein, said compression means is a reversible loss less compression means.

4. A system as claimed in claim 1 wherein, said compression means is a bijective compression means.

5. A system as claim 1n claim 1 wherein, said means to carry out T-functioning comprises a mapping means adapted to carry out bijective mapping of said bits for updating each of said bit of said message.

6. A system as claimed in claim 1 wherein, said means to carry out T-functioning is a means to carry out triangular T-functioning.

7. A system as claimed in claim 1 wherein, said means to carry out T-functioning comprises a dispersing means adapted to specify message hashes to be dispersed over the entire bits.

8. A system as claimed in claim 1 wherein, said T-functioning means is a bijective T-functioning means.

9. A system as claimed in claim 1 wherein, said T-functioning means is an invertible T-functioning means.

10. A system as claimed in claim 1 wherein, said means to perform Linear Feedback Shift Registering (LFSR) is a bijective means.

11. A system as claimed in claim 1 wherein, said system comprises:
   a) a message generator adapted to generate a message;
   b) a pre processor adapted to pre process said message to resist collision attack;
   c) a hashing means adapted to hash said pre processed message and to obtain a hashed output value;
   d) a signature generating means adapted to generate a signature of said hashed output value;
   e) a comparator means adapted to compare said generated signature of said hashed output value and said pre processed message to detect invalid signature due to message tampering.

12. A method for preventing hash collisions during transmission of data comprises the following steps:
   a) Generating a message;
   b) Inputting the message m to a pre processor;
   c) Pre processing the message to resist collision attacks, said step of message pre-processing further comprising the following steps:
      Shuffling of message bits to obtain shuffled bits;
      Compressing said shuffled message bits to remove redundancies and to increase randomness of said shuffled bits;
      T functioning of said compressed shuffled message bits to achieve avalanche effect in said data; and
      Linear Feed back Shift Registering (LFSR) of said compressed shuffled bits to obtain a pre processed message;
   d) Hashing said message;
   e) Producing a hash value; and
   f) Generating a signature of said hashed value;
   g) Comparing said generated signature of said hashed value and said pre processed message to detect invalid signature due to message tampering.

13. The method as claimed in claim 12 wherein said step of shuffling of bits further comprises the step of producing a statistical effect on the output bits.

14. The method as claimed in claim 13 wherein said step of shuffling of bits further comprises the step of dissipating the redundancy in the statistics of input data to the output data.

15. The method as claimed in claim 12 wherein said step of shuffling is bijective.

16. The method as claimed in claim 15 wherein the swapping of message bits in the reverse order accomplishes inverse shuffling.

17. The method as claimed in claim 12 wherein said step of compression further comprises the step of affecting directly or indirectly any later bit of output bit by any input bit.

18. The method as claimed in claim 17 wherein said step of compression generates a fast avalanche effect.

19. The method as claimed in claim 12 wherein said step of compression is a reversible loss less compression algorithm to avoid data loss.

20. The method as claimed in claim 17 wherein said step of compression is bijective.

21. The method as claimed in claim 12 wherein said step of T functioning comprises the step of bijective mapping of bits for updating every bit of the message.

22. The method as claimed in claim 21 wherein said step of updating follows a linear combination of the same bit and a function of a subset of its less significant bits.

23. The method as claimed in claim 21 wherein said T function is triangular.

24. The method as claimed in claim 21 wherein said step of T functioning comprises the step of abstracting mathematically the non-linearity between input and output bits.

25. The method as claimed in claim 21 wherein said step of T functioning comprises the step of specifying message hashes to be dispersed over the entire bits.

26. The method as claimed in claim 21 wherein said T functioning is bijective and invertible.

27. The method as claimed in claim 21 wherein said step of T functioning follows the Boolean function $(2x^2+x) \mod 2^{32}$ where 32 is the no. of bits x of message m.

28. The method as claimed in claim 12 wherein said step of LFSR of bits further comprises a step of generating sequences of highly dense primitive polynomials of maximum period.

29. The method as claimed in claim 28 wherein said primitive polynomial is irreducible of degree 32 and period $2^{32}-1$.

30. The method as claimed in claim 28 wherein said LFSR comprises the step of shifting the 32 bit input data with said primitive polynomial.

31. The method as claimed in claim 30 wherein said step of shifting is performed for 4 to 15 cycles.

32. The method as claimed in claim 28 wherein said step of LFSR is bijective.

33. The method as claimed in claim 13 comprises the step of inputting said linear feedback shift registered bits into a hash function to generate a hash output value.

34. A method for detecting hash collisions during transmission of data comprises the following steps:
   a) Generating a message m;
   b) Pre processing the message m to generate MP (m) said step of message pre-processing further comprising the following steps:
   Shuffling of message bits to obtain shuffled bits;
   Compressing said shuffled message bits to remove redundancies and to increase randomness of said shuffled bits;
   T functioning of said compressed shuffled message bits to achieve avalanche effect in said data; and
   Linear Feed back Shift Registering (LFSR) of said compressed shuffled bits to obtain a pre processed message;
   c) Generating the hash of pre processed message m as H (MP (m));
   d) Generating the signature of the said hash as {sign (H (MP (m)};
   e) Comparing the said generated signature of message m and the message pre processing function of message m (1);
   f) Detecting an invalid signature due to message tampering.

* * * * *